United States Patent
Takeuchi et al.

(10) Patent No.: US 7,133,542 B2
(45) Date of Patent: Nov. 7, 2006

(54) FINGERPRINT VERIFICATION DEVICE AND FINGERPRINT VERIFICATION METHOD

(75) Inventors: Hideyo Takeuchi, Nagoya (JP); Taizo Umezaki, Tajimi (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 699 days.

(21) Appl. No.: 10/381,514

(22) PCT Filed: Sep. 28, 2001

(86) PCT No.: PCT/JP01/08495

§ 371 (c)(1),
(2), (4) Date: Mar. 27, 2003

(87) PCT Pub. No.: WO02/29720

PCT Pub. Date: Apr. 11, 2002

(65) Prior Publication Data

US 2004/0013287 A1    Jan. 22, 2004

(30) Foreign Application Priority Data

Sep. 29, 2000   (JP) .............................. 2000-299015

(51) Int. Cl.
  *G06K 9/00* (2006.01)
(52) U.S. Cl. ...................... 382/124; 382/125; 382/219; 340/5.82; 340/5.83; 713/186
(58) Field of Classification Search .............. 382/115, 382/124, 125, 209, 127, 181, 116, 126, 218, 382/173, 190, 219, 276, 278; 283/68, 69; 340/5.8, 5.81, 5.82, 5.83, 5.52, 5.53; 356/71; 713/186
See application file for complete search history.

(56) References Cited

U.S. PATENT DOCUMENTS

| | | | | |
|---|---|---|---|---|
| 5,040,224 A | * | 8/1991 | Hara ........................... | 382/124 |
| 5,426,708 A | * | 6/1995 | Hamada et al. ............. | 382/125 |
| 5,537,484 A | * | 7/1996 | Kobayashi ................... | 382/124 |
| 5,832,102 A | | 11/1998 | Uchida | |
| 6,047,079 A | | 4/2000 | Uchida | |

FOREIGN PATENT DOCUMENTS

| | | |
|---|---|---|
| JP | A 6-139338 | 5/1994 |
| JP | A 6-223160 | 8/1994 |
| JP | A 7-57084 | 3/1995 |
| JP | A 7-57085 | 3/1995 |
| JP | A 7-57092 | 3/1995 |
| JP | A 7-105373 | 4/1995 |

* cited by examiner

*Primary Examiner*—Sheela Chawan
(74) *Attorney, Agent, or Firm*—Oliff & Berridge, PLC

(57) ABSTRACT

The present invention provides technologies for narrowing down fingerprints images, which will be used for identity determination, without extracting auxiliary information such as a fingerprint pattern, thereby shortening the time required for fingerprint verification. The device according to the present invention includes a storage means 26 for storing characteristic information extracted from fingerprint images of registered persons, and a collection means 10 for collecting a fingerprint image. First, a extraction means 14 extracts characteristic information from the fingerprint image collected by the collection means 10. Next, a narrowing means 16 calculates a similarity between part of the characteristic information of the person to be identified, which was extracted by the extraction means 14, and corresponding part of the characteristic information of each of the registered persons, which is stored in the storage means 26. Based upon the calculated similarity, the registered fingerprints that will be used for the identity determination are narrowed down. Then, an determination means 18 determines whether or not the characteristic information of each of the registered fingerprints, which were narrowed down by the narrowing means 16, matches the characteristic information of the person to be identified, which was extracted by the extraction means 14.

According to this device, the registered fingerprints that will be used for the identity determination are narrowed down by using the characteristic information that will be used for the identity determination. Therefore, without extracting auxiliary information, such as a fingerprint pattern, from the collected fingerprint image, the fingerprint images that will be used in order to determine the identity of the fingerprint are narrowed down. Thus, the time required for the fingerprint verification can be shortened.

12 Claims, 14 Drawing Sheets

| Shifting Width | GDS Pattern |
|---|---|
| $WD_0$ | Pattern1 / Pattern2 ←→ Shifting Width |
| $WD_0$ + step | |
| ⋮ | ⋮ |
| $WD_0$ + i·step | |
| ⋮ | ⋮ |
| $WD_0$ + (n-2)·step | |
| $WD_0$ + (n-1)·step | |

FINGERPRINT VERIFICATION DEVICE AND FINGERPRINT VERIFICATION METHOD

FIELD OF THE INVENTION

The present invention relates to fingerprint verification technology for comparing a collected fingerprint with a plurality of registered fingerprints.

BACKGROUND ART

A fingerprint verification device is used to compares a fingerprint image, which has been collected from a person to be identified, with registered fingerprint images in order to determine whether or not the fingerprint of the person to be identified matches one of the fingerprints of the registered persons. Whether the two corresponding fingerprint images match or not is determined in such a manner that characteristic information(e.g., such as minutia (i.e., characteristic point) or a spectrum characteristic, which is used in order to identify the fingerprint image), which have been extracted from the respective fingerprint images, are compared with each other. Therefore, the fingerprint image verification device includes a memory that stores characteristic information extracted from the fingerprint images of the registered persons. When the fingerprint is verified, characteristic information, which is extracted from the fingerprint image of the person to be identified, is compared with each pre-stored characteristic information, thereby determining whether the two corresponding fingerprint images match or not.

Some type of such a fingerprint verification device eliminates the need to input auxiliary identification information such as an ID code, and compares a fingerprint image of a person to be identified with all the registered fingerprint images. This type of fingerprint verification device has a problem that as the number of registered fingerprints increases, the verifying time becomes longer. In order to solve the problem, several technologies (e.g., Japanese Laid-open Patent Publication No. 10-187970) have been developed, in which the registered fingerprints that will be used for verification (i.e., identity determination) of the fingerprint of the person to be identified are narrowed down in advance and only the narrowed registered fingerprints are compared with the person's fingerprint.

In the fingerprint verification device described in the above-mentioned publication, the registered fingerprints are categorized and stored according to fingerprint patterns. After the fingerprint image of the person to be identified is collected, a fingerprint pattern is obtained from the fingerprint image. Then, fingerprint images belonging to the same category as the obtained fingerprint pattern are selected from the registered fingerprints. Subsequently, the characteristic information of each fingerprint image belonging to the selected category is compared with the characteristic information of the collected fingerprint image.

However, in the technology described in the publication, in addition to the characteristic information that is necessary in order to determine the identity of the fingerprint image, auxiliary information such as the fingerprint pattern must be extracted from the fingerprint image of the person to be identified. In order to extract the auxiliary information, an additional process is required, which makes the system complex.

Accordingly, it is an object of the present invention to provide fingerprint verification technologies whereby registered fingerprint images that are used for verification (i.e., identity determination) can be narrowed down without extracting auxiliary information, such as a fingerprint pattern, from a collected fingerprint image.

DISCLOSURE OF THE INVENTION

A fingerprint verification device according to the present invention compares a fingerprint of a person to be identified with a plurality of registered fingerprints, and includes a characteristic information storage means that stores characteristic information extracted from the fingerprint images of the registered persons. In addition, the fingerprint verification device includes a fingerprint image collection means that collects the fingerprint images. The fingerprint of the person to be identified is collected by the fingerprint image collection means.

The fingerprint image collected by the fingerprint image collection means is compared with the registered fingerprint images by the following means, which are explained below. First, a characteristic information extraction means extracts characteristic information from the collected fingerprint image. Then, a registered fingerprint narrowing means calculates a similarity between part of the characteristic information of the person to be identified, which has been extracted by the characteristic information extraction means, and corresponding part of the characteristic information of each registered person, which is stored in the characteristic information storage means. Thereafter, based upon the calculated similarity, the registered fingerprint narrowing means narrows down the registered fingerprints that will be used for identity determination. Subsequently, an identity determination means determines whether or not the characteristic information of each of the registered fingerprints, which were narrowed down by the registered fingerprint narrowing means, matches the characteristic information of the person to be identified, which has been extracted by the information extraction means.

According to the above-described fingerprint verification device, the registered fingerprints that will be used for the identity determination are narrowed down by using the characteristic information that will be used for the identity determination. Therefore, extraction of auxiliary information, such as a fingerprint pattern, from the collected fingerprint image is not required. In addition, because the registered fingerprints are narrowed down by using part of the characteristic information extracted from the fingerprint image, the number of times that calculation is carried out does not increase.

Herein, the "characteristic information" means information that is used in order to determine the identity of the fingerprint image. For instance, a minutia (i.e., characteristic point) and a spectrum characteristic, each of which is obtained by processing a fingerprint image by a predetermined manner, are equivalent to the "characteristic information".

Also, the "part of characteristic information" means information in which an amount of data has been reduced by processing the characteristic information by a predetermined method. For example, appropriately selected part (predetermined area) of the extracted characteristic information, and information obtained by compressing the characteristic information are equivalent to the "part of characteristic information".

In addition, the "corresponding part" is not limited to the part that exactly corresponds to the "part of characteristic information" of a person to be identified. For example, the "corresponding part" may include at least part of the "characteristic information" of the person to be identified. Therefore, the "corresponding part" may be larger than or smaller than the "part of characteristic information".

Preferably, by using other part of the characteristic information, which has not been used for similarity calculation by the registered fingerprint narrowing means, the identity determination means calculates a similarity between the characteristic information extracted from the fingerprint image of the person to be identified and the characteristic information of each of the registered fingerprints, which was narrowed down. Thereafter, the identity determination means determines the identity based upon the sum of this calculated similarity and the similarity that has been calculated by the registered fingerprint narrowing means.

In such a construction, when the identity determination is carried out, the similarity between the other part of the characteristic information, which has not been used for the similarity calculation in order to narrow down the registered fingerprints, and corresponding part of the characteristic information is calculated. Then, the identity of the fingerprint image is totally determined based upon the sum of this calculated similarity and the similarity calculated for narrowing down the registered fingerprints. Because the similarity calculated in order to narrow down the registered fingerprints is utilized in order to determine the identity as well, the amount of calculation can be further reduced.

In addition, the characteristic information is preferably represented by a characteristic of a spectrum, which is obtained by converting the frequency of a density variation along each of scanning lines, in which the density variation is regarded as a time series signal. The scanning lines extend in two directions orthogonal to each other.

In such a construction, the fingerprint image can be represented by less data. Accordingly, the narrowing process and the identity determination process speed up. Specifically, the fingerprint image data [comprising (n×m) dots] is represented by density of respective points or dots [i.e., the amount of data is (n×m)]. On the other hand, if frequency conversion is performed for each scanning line in each direction (e.g., dispersion frequency conversion is performed for x channels), data of scanning lines in one of the directions is (n-scanning lines×x-channels). Likewise, data of scanning lines in other direction is (m-scanning lines×x-channels). Generally, the number of channels x can be smaller than n and m. Therefore, the amount of data can be remarkably reduced.

In the fingerprint verification device according to one aspect of the present invention, preferably, the registered fingerprint narrowing means calculates a similarity between a spectrum characteristic in one direction, which has been extracted from a fingerprint image of a person to be identified, and a corresponding spectrum characteristic in the one direction, which was extracted from each registered person; then the registered fingerprint narrowing means narrows down the registered fingerprints based upon the calculated similarity. In addition, preferably, by using a spectrum characteristic in other direction which was not used for the similarity calculation by the registered fingerprint narrowing means, the identity determination means calculates a similarity between the spectrum characteristic extracted from the fingerprint image of the person to be identified and the spectrum characteristic of each of the narrowed registered fingerprints; then the identity determination means determines the identity of the fingerprint based upon the sum of this calculated similarity and the similarity that has been calculated by the registered fingerprint narrowing means.

According to such a construction, the narrowing process can be performed by calculating the similarity between the spectrum characteristics in one direction. Therefore, the similarity calculated in the narrowing process can be used in the identity determination process as well.

Preferably, as the part of characteristic information, which is extracted from the fingerprint image, the registered fingerprint narrowing means uses part that contains sufficient identification information; the registered fingerprint narrowing means narrows down the registered fingerprints based upon a similarity calculated using such part.

According to such a construction, because the part containing sufficient identification information is used, the narrowing process accuracy improves.

Preferably, when calculating the similarity between the part of the characteristic information extracted from the fingerprint image of the person to be identified and the corresponding part of the characteristic information of each of the stored registered fingerprints, the registered fingerprint narrowing means calculates and stores a width of shift between the two pieces of characteristic information. Preferably, within a predetermined area, which includes the width of shift that was stored by the registered fingerprint narrowing means, the identity determination means compares the characteristic information extracted from the fingerprint image of the person to be identified with the characteristic information of each of the registered fingerprints, which were narrowed down.

In such a construction, because the identity is determined using the width of shift calculated by the registered fingerprint narrowing means, the amount of calculation that is required for the identity determination can be decreased.

Herein, the "width of shift" means a difference in position between the two corresponding fingerprint images. The difference occurs depending on which part of a fingerprint collection plate the finger is pressed against in order that a fingerprint image of the finger is collected. Generally, the "width of shift" is represented by widths of shift between the two corresponding fingerprint images in the longitudinal and lateral directions (i.e., two directions intersecting orthogonally), and by an angle of shift in the longitudinal direction (or lateral direction).

The characteristic information extraction means, the registered fingerprint narrowing means, and the identity determination means that comprise the above-described device of the present invention can be realized by a single controller (e.g., microcomputer, processor, etc)(i.e., by a program for performing each function). Other hardware can also be constructed variously.

A fingerprint verification device according to other aspect of the present invention compares a fingerprint image of a person to be identified with a plurality of registered fingerprints. The fingerprint verification device includes a characteristic information storage portion that stores for each registered person a plurality of pieces of characteristic information, which were respectively extracted from the fingerprint images collected from the same finger of the registered person. In addition, the fingerprint verification device includes a fingerprint image collection portion that collects a fingerprint image. The fingerprint of the person to be identified is collected by the fingerprint image collection portion.

The collected fingerprint is identified by being compared with the fingerprint images of the registered persons, which are stored in the characteristic information storage portion, by a fingerprint verification portion in the following manner. First, characteristic information is extracted from the fingerprint image that was collected by the fingerprint image collection portion. Next, part of or all the extracted characteristic information is compared with corresponding parts of some of the pieces of the characteristic information, which were selected for each registered person from the characteristic information stored in the characteristic information storage portion. Consequently, the registered persons that will be used for the identity determination are narrowed down. Subsequently, the identity determination is performed in such a manner that each of the pieces of characteristic information of each of the registered persons narrowed down is compared with the characteristic information extracted from the fingerprint image of the person to be identified.

In this fingerprint verification device, because the narrowing operation is performed on a registered person basis, the fingerprint images (i.e., pieces of characteristic information), which will be used for the identity determination, can be efficiently narrowed down.

BRIEF EXPLANATION OF THE DRAWINGS

FIG. 8 is a diagram that explains a procedure for calculating a distance, taking a width of shift into consideration.

BEST MODE FOR PRACTICING THE INVENTION

Figure 1:
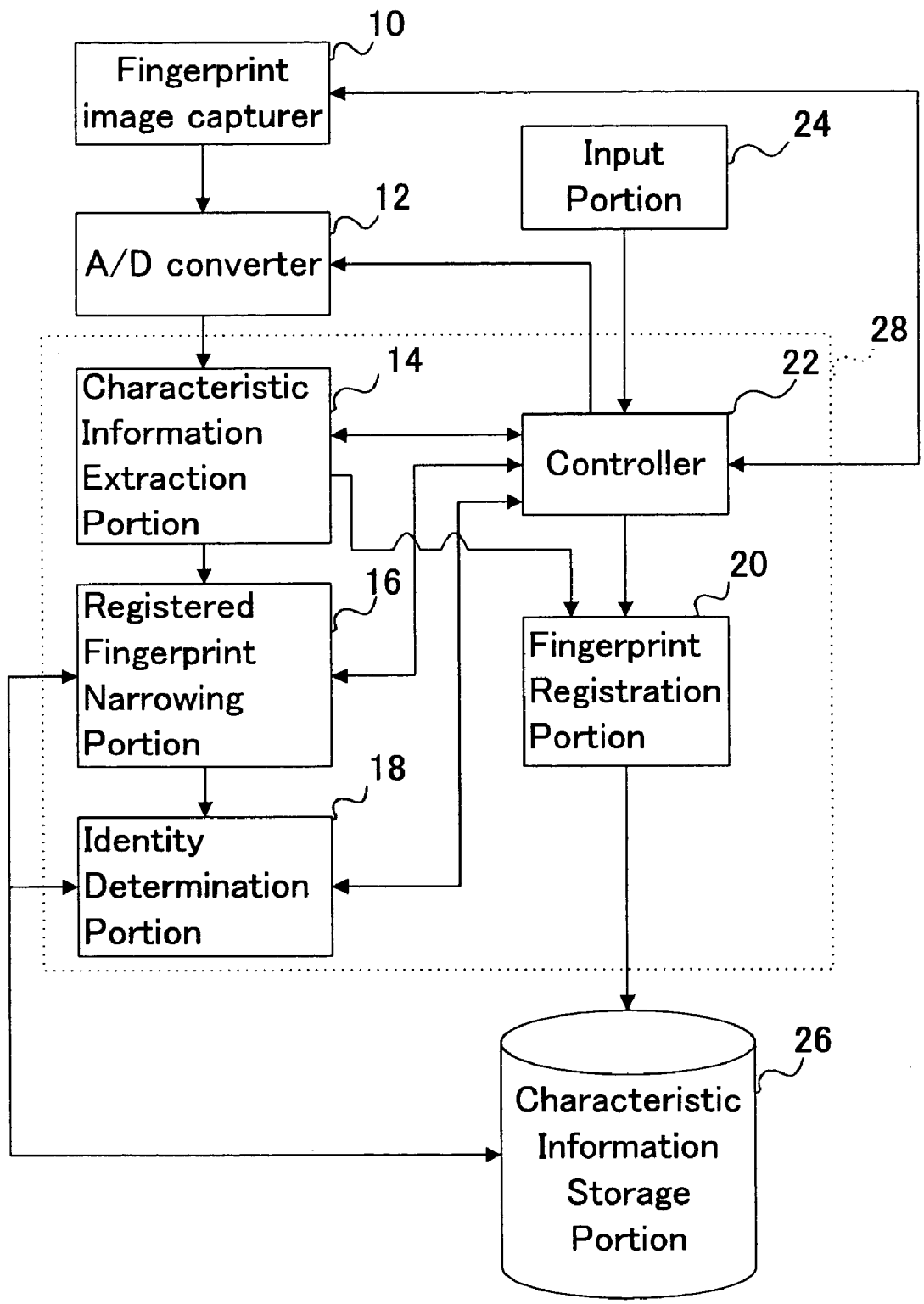
FIG. 1 is a block diagram showing the overall construction of a fingerprint verification device according to one embodiment of the present invention.

An embodiment of a fingerprint verification device according to the present invention will be explained below with reference to the drawings. FIG. 1 is a block diagram showing the overall construction of the fingerprint verification device.

As shown in FIG. 1, the fingerprint verification device includes a characteristic information storage portion 26, which serves as a memory where characteristic information extracted from fingerprint images of registered persons are stored. In addition, the fingerprint verification device includes a fingerprint image capture 10, which serves as a fingerprint input portion that records a fingerprint and outputs a video signal. An A/D converter 12 is connected to the fingerprint image capture 10 in order to convert the video signal (analog signal), which is output from the fingerprint image capture 10, into fingerprint image data (digital data). The fingerprint image data converted into the digital form by the A/D converter 12 is processed by a microcomputer 28.

The microcomputer 28 includes ROM, RAM, CPU, etc., and performs various functions by being operated following programs that are stored in the ROM. That is, the microcomputer 28 functions as a characteristic information extraction portion 14, a registered fingerprint narrowing portion 16, an identity determination portion 18, a fingerprint registration portion 20, and a controller 22. The characteristic information extraction portion 14 extracts the characteristic information from the fingerprint image data that was input from the A/D converter 12. The registered fingerprint narrowing portion 16 narrows down registered fingerprints that will be used for identity determination, in which the registered fingerprints are compared with the fingerprint captured by the fingerprint image capture 10. The identity determination portion 18 determines whether or not each of the registered fingerprints, which were narrowed down by the registered fingerprint narrowing portion 16, matches the captured fingerprint. The fingerprint registration portion 20 registers into the characteristic information storage portion 26 the characteristic information that was extracted by the characteristic information extraction portion 14. The controller 22 controls the registration and verification operations. An input portion 24 is connected to the microcomputer 28. The input portion 24 includes keyboard for selecting either the registration operation or the verification operation.

Figure 3:
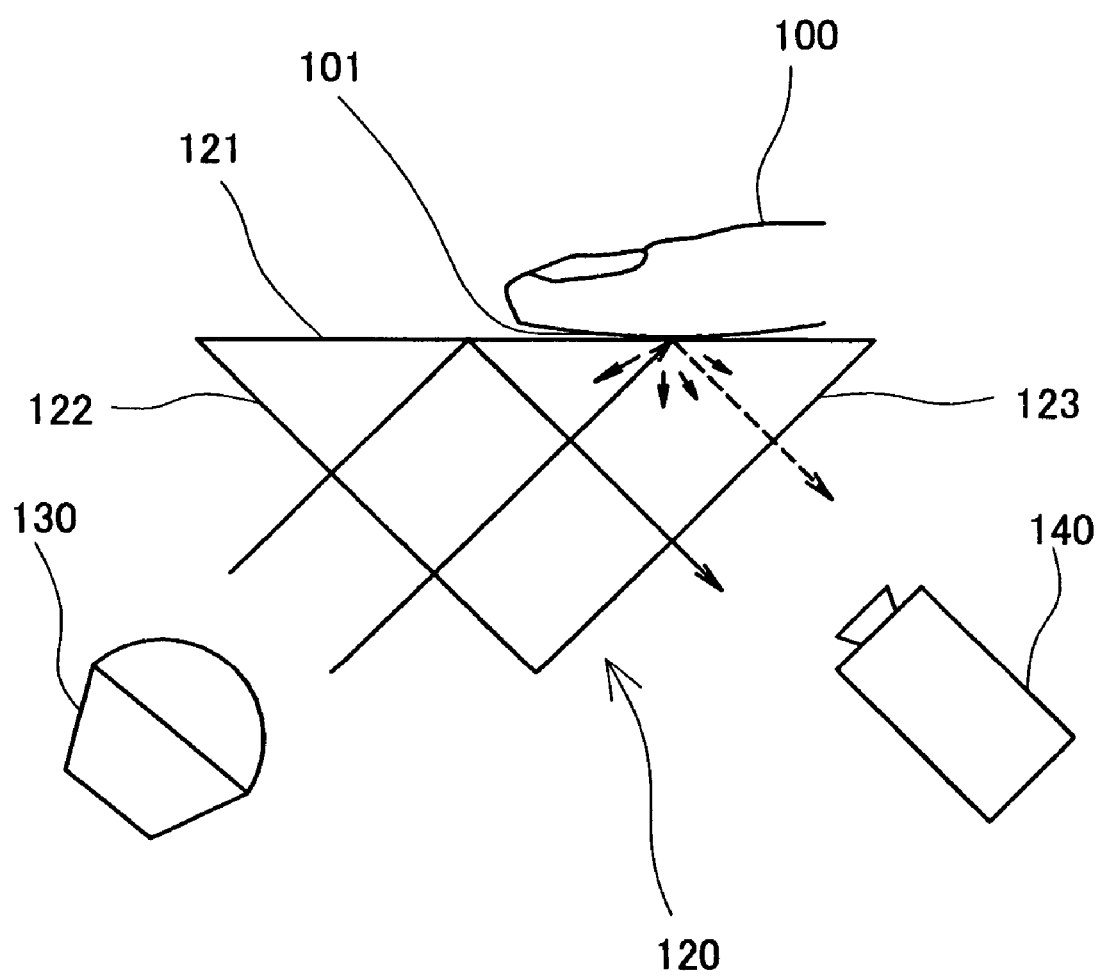
FIG. 3 is a schematic view showing diagrammatically the construction of a fingerprint image collection section.

The fingerprint image capture 10 is disposed near a door that closes the entrance to a room. As shown in FIG. 3, the fingerprint image capture 10 includes a right angle prism 120 having a prism surface 121, onto which a fingerprint surface 101 of a finger 100 is pressed. In a position that is opposite to an oblique surface 122 of the right angle prism 120, a light source 130 that illuminates the prism oblique surface 122 is disposed. On the other hand, in a position that is opposite to an oblique surface 123 of the right angle prism 120, a CCD camera 140 is disposed. The CCD camera 1400 receives reflected light that corresponds to a fingerprint ridgeline portion as a dark image, and receives reflected light that corresponds to the fingerprint furrow line portion as a light image. The video signals (i.e., dark and light images of the fingerprint ridgelines) collected by the CCD camera 140 are transmitted at a predetermined frequency (several milliseconds) via a coaxial cable to the A/D converter 12.

The A/D converter 12 converts the video signal (analog signal) transmitted from the fingerprint image capture 10 into a digital signal. The fingerprint image data (i.e., two-dimensional digital dark and light data) obtained by the A/D conversion is stored in the memory incorporated in the microcomputer 28.

Figure 4:
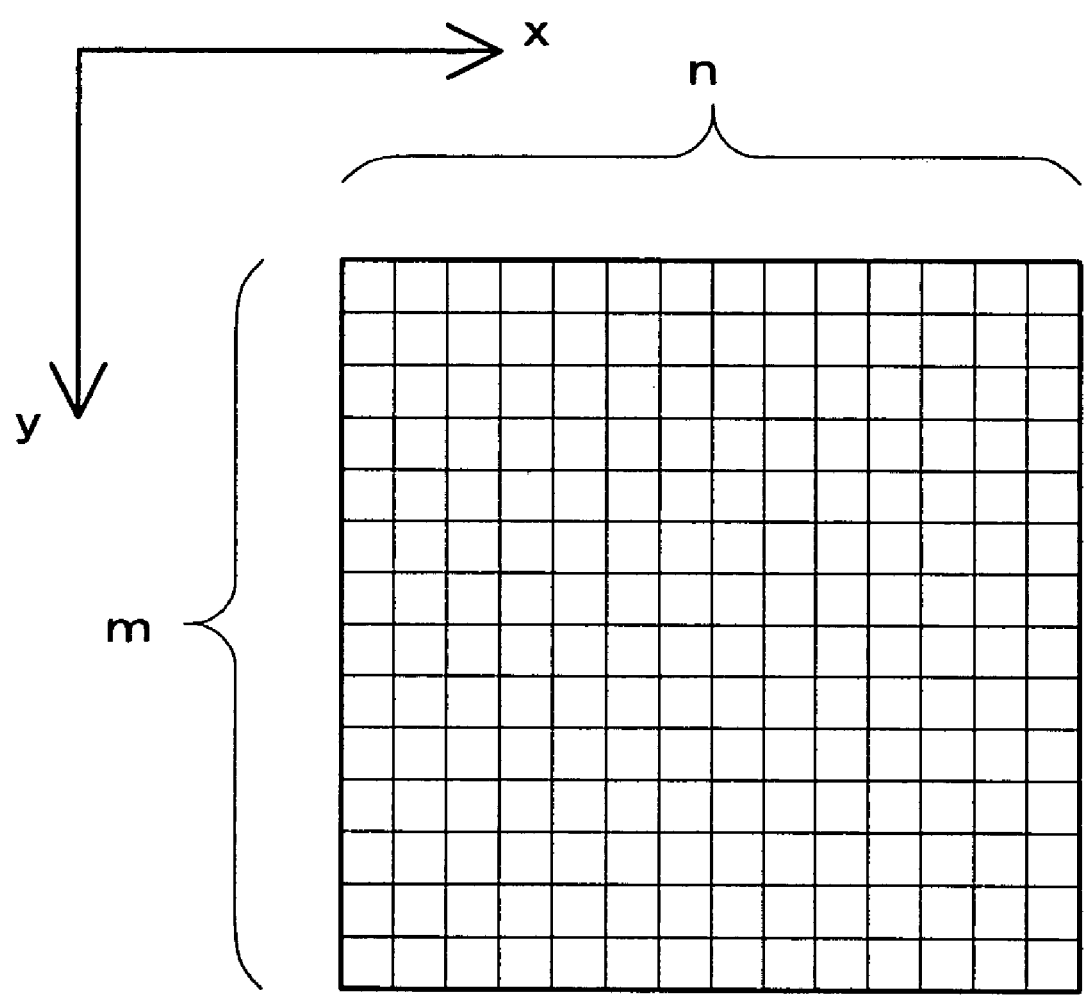
FIG. 4 is a diagram that explains the composition of data of a fingerprint image collected by the fingerprint image collection section.
Figure 5:
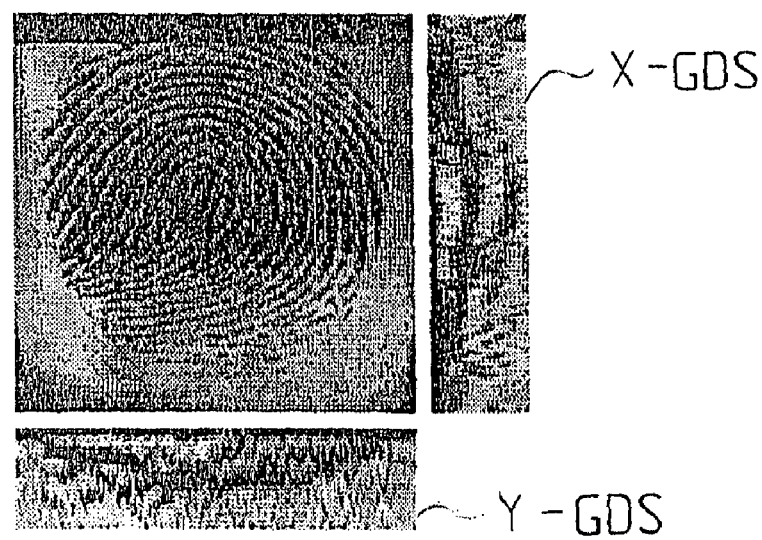
FIG. 5 shows a fingerprint image, GDS extracted from the fingerprint image, and a chart showing an example of density variation along the direction of one scanning line.
Figure 5:
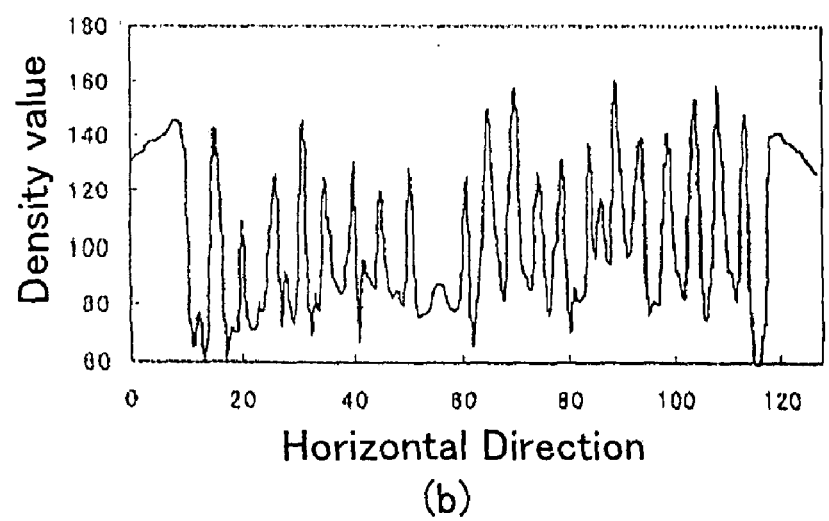
Figure 6:
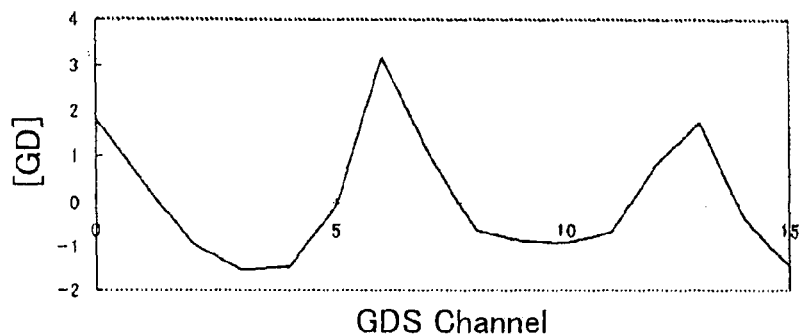
FIG. 6 is a chart showing one example of a GDS pattern obtained from density variation along the direction of one scanning line.

The characteristic information extraction portion 14 extracts characteristic information from the image data obtained by the conversion performed by the A/D converter 12. A procedure for extracting the characteristic information will now be explained with reference to FIGS. 4 to 6. FIG. 4 is a diagram that explains the construction of fingerprint image data. FIG. 5 shows a fingerprint image, extracted characteristic information, and a density variation along one scanning line of the fingerprint image data. FIG. 6 shows an example of a group delay spectrum (hereafter called "GDS"), which is computed from the density variation along the scanning line.

As shown in FIG. 4, the fingerprint image, (refer to FIG. 5($a$)), which was collected by the fingerprint image capture 10 is converted into image density data comprising n×m dots in the x direction and y direction (i.e., the number of dots in the x direction is n and the number of dots in the y direction is m). That is, the fingerprint image collected by the fingerprint image capture 10 is converted to image density data d at coordinates (a, b) in the x direction and y direction. Characteristic information (i.e., GDS) is extracted from the density data at the corresponding coordinates.

Specifically, for the above-described image data (n×m dots), an m-number of scanning lines are disposed in the x direction and an n-number of scanning lines are disposed in the y direction. Then, a density variation along the corresponding scanning line is obtained. FIG. 5($b$) shows an example of the obtained density variation. As clearly shown in FIG. 5($b$), the density varies in the form of a waveform signal along the scanning line; the density at a point on the fingerprint ridgeline is low (dark) and the density at a point on the fingerprint furrow line is high (light).

Subsequently, the obtained density variation along the scanning line is regarded as a time series signal, and the time series signal is frequency converted in order to obtain a GDS. The GDS is calculated as GDS intensity for each frequency channel (ch). As shown in FIG. 6, one GDS pattern is obtained from one scanning line. Therefore, the extracted GDS is defined as GDS intensity for each scanning line (i-th scanning line) and each frequency channel (ch). That is, as expressed by Equation 1, the GDS strength is defined as a function that is determined by the value of the scanning line and the value of the frequency channel (i,ch).

$$GDS=GDS(i,ch) \quad \text{(Equation 1)}$$

The GDS obtained in the above-described procedure is expressed by a two-dimensional image having density that varies according to the magnitude of the GDS intensity (hereinafter called "GDS pattern"), which is shown on the right of and below the fingerprint image of FIG. 5($a$). That is, the GDS pattern calculated from the m-number of scanning lines in the x direction is shown on the right of the fingerprint image. Likewise, the GDS pattern calculated from the n-number of scanning lines in the y direction is shown below the fingerprint image. The GDS patterns differ according to characteristics (i.e., individual characteristics) of fingerprint ridgelines (fingerprint furrow lines). In the present embodiment, a similarity between two corresponding GDS patterns is judged in order to determine whether or not the fingerprint collected from a person to be identified is the same as a registered fingerprint.

The characteristic information (GDS), which was extracted by the characteristic information extraction portion 14, is stored into the characteristic information storage portion 26 after related to corresponding registered person by the fingerprint registration portion 20. Specifically, into the characteristic information storage portion 26, the fingerprint registration portion 20 stores the extracted characteristic information in relation to the corresponding identification information (e.g., name or ID number) that was input by the input portion 24 in order to specify a registered person. In the characteristic information storage portion 26, pieces of characteristic information, which were respectively extracted from fingerprint images collected from the same finger (e.g., the number of images is a), are registered. Therefore, for example, if the number of persons who are registered in the fingerprint verification device is b, the number of pieces of information that is stored in the characteristic information storage portion 26 is equal to the number of pieces of information extracted from (a×b) fingerprint images (i.e. in the present embodiment, (a×b) pieces of information in the x direction and (a×b) pieces of information in the y direction).

The registered fingerprint narrowing portion 16 and identity determination portion 18 will be explained in detail later when the fingerprint registration operation and the fingerprint verification operation are explained. Therefore, their detailed description will be omitted here.

Figure 2:
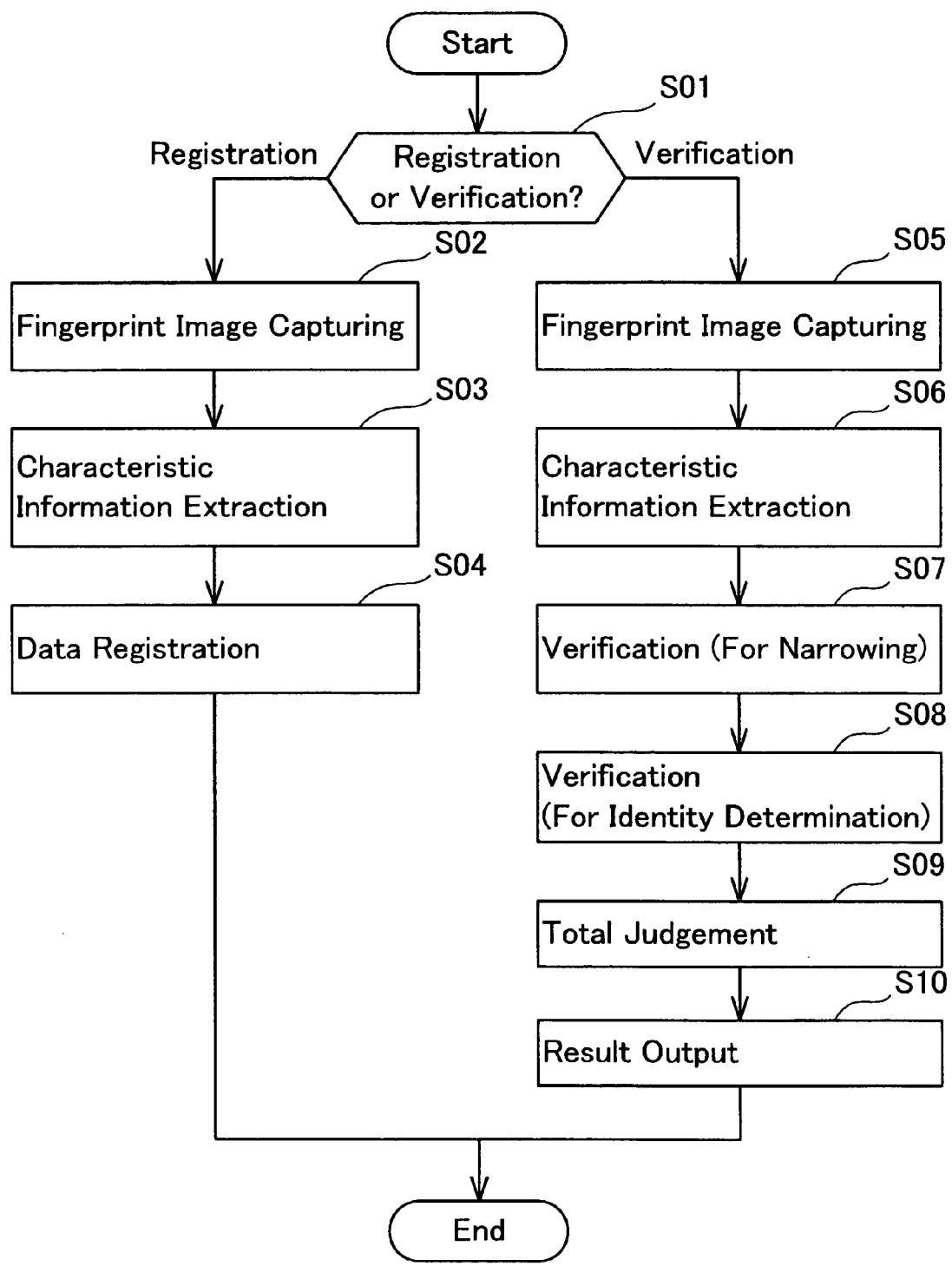
FIG. 2 is a flowchart showing the operation of the fingerprint verification device performing fingerprint registration/fingerprint verification.

Now, the fingerprint registration operation of the fingerprint verification device, which is constructed as described above, will be briefly explained with reference to a flowchart of FIG. 2.

In order to register a fingerprint, a person to be identified as a registered person operates an input portion 24 (e.g., presses a registration button and inputs an ID number), thereby entering a request for fingerprint registration (S01). After the registration request is input to the input portion 24, controller 22 outputs an instruction to the fingerprint image capture 10 in order to start the fingerprint image collection process. Consequently, the fingerprint image collection process is started by the fingerprint image capture 10 (S02). In the fingerprint image collection process, the fingerprint image capture 10 and the A/D converter 12 are first actuated in order to collect image data. Then, whether the time variation of the collected data has stabilized or not is determined. When the collected image data has stabilized (i.e., when the pressing force of the finger against the right angle prism 120, or a fingerprint collecting plate, has stabilized), it is determined that the fingerprint image has been collected. Consequently, the fingerprint image collection process is completed. As the fingerprint image collection process, for example, a technique described as in Japanese Laid-open Patent Publication No. 9-274656 can be used.

After the fingerprint image collection process is completed, GDS patterns (i.e., characteristic information) in the x and y directions are extracted from the collected fingerprint image (S03). The extracted characteristic information is stored in the characteristic information storage portion 26 after related to the input identification number (S04). The above-described operation is the fingerprint registration operation that is performed by the fingerprint verification device.

Next, the fingerprint verification operation that is performed by the fingerprint verification device will be explained. As shown in FIG. 2, a person to be identified actuates the input portion 24 (e.g., presses a fingerprint verification button), thereby inputting a fingerprint verification command (S01). After the fingerprint verification command is input, a fingerprint image collection process is performed (S05). Then, characteristic information (i.e, GDS) is extracted from the collected fingerprint image (S06). After the characteristic information is extracted from the fingerprint image, the registered fingerprint narrowing portion 16 narrows down registered fingerprints by using part of the extracted characteristic information (S07). The registered fingerprint narrowing process in step S07 will be discussed in further detail below.

Figure 7:
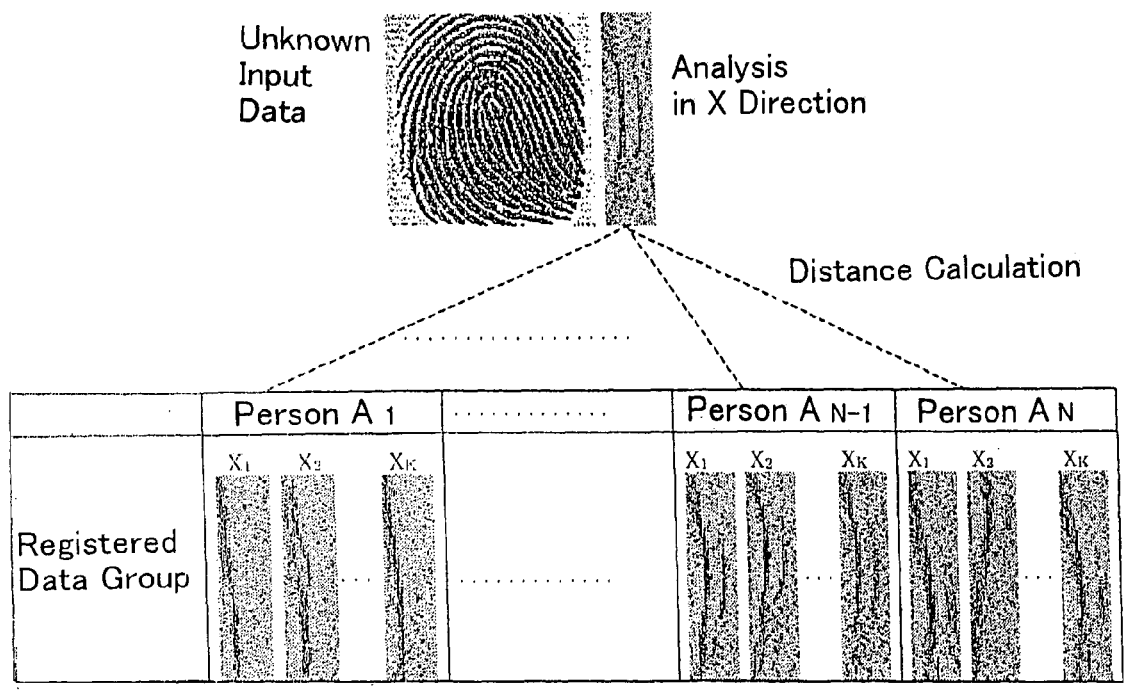
FIG. 7 is a diagram that explains one example of a narrowing process.

As explained above, the characteristic information (i.e. characteristic information stored in the characteristic information storage portion 26), which is extracted by the characteristic information extraction portion 14, is a GDS pattern extracted in the x direction and a GDS pattern extracted in the y direction. The registered fingerprint narrowing portion 16 narrows down the registered fingerprints by comparing the extracted GDS pattern in the x or y direction with each of corresponding GDS patterns stored in the characteristic information storage portion 26. In the present embodiment, as shown in FIG. 7, the registered fingerprints are narrowed down by using the GDS pattern in the x direction. This is because, generally, the ridgelines cross more scanning lines in the x direction than scanning lines in the y direction, which makes a density waveform in the x direction more complex. Therefore, the GDS pattern extracted in the x direction contains more identification information. In the present embodiment, by using the GDS pattern in the x direction, narrowing operation accuracy is enhanced. However, instead of the GDS pattern in the x direction, which is used in the present embodiment, the registered fingerprints may be narrowed down by using the GDS pattern in the y direction depending on a condition for narrowing down the registered fingers (e.g., the number to which the registered fingerprints are narrowed down).

A procedure for narrowing down the registered fingerprints will be explained in further detail below. As shown in FIG. 7, the registered fingerprint narrowing portion 16 calculates a distance ($dist_x$) between the GDS pattern in the x direction, which was extracted from the collected fingerprint image, and each GDS pattern in the x direction, which is stored in the characteristic information storage portion 26. The distance (dist) is a value that is calculated in order to evaluate the similarity between the GDS pattern [$GDS_{t_r}(i, ch)$] extracted from the collected fingerprint image and the GDS pattern [$GDS_{t_i}(i, ch)$] extracted from each registered fingerprint image. In the present embodiment, as expressed by Equation 2, the absolute value of the difference between the GDS strengths is obtained for all the scanning lines (i) and frequency channels (ch). The sum of the absolute values obtained in this manner is defined as the distance (dist).

$$dist_x = \Sigma\Sigma|GDS_t(i, ch) - GDS_i(i, ch)| \quad \text{(Equation 2)}$$

In the present embodiment, when the above-described distance ($dist_x$) is calculated, an amount of shift by which two corresponding fingerprint images are shifted one from other is taken into consideration. As shown in FIG. 8, the middles of two GDS patterns for comparison are shifted in the range of $-WD_0$ to $+WD_0$ and each distance is calculated. The shortest distance is used as the distance between the two corresponding GDS patterns. The amount of shift of the two corresponding GDS patterns in the case of obtaining the shortest distance will be hereinafter referred to as a width of shift of the two corresponding GDS patterns.

The distance between each of the GDS patterns in the x direction, which are stored in the characteristic information storage portion 26, and the GDS pattern in the x direction, which was extracted from the collected fingerprint image, is calculated according to the above-described procedure. From the calculated distances, a predetermined number (n-number) of distances are selected in order of increasing distance, and the selected registered fingerprints will be used for the identity determination.

After the registered fingerprints are narrowed down in the above-described manner, the fingerprint identification portion 18 performs the identity determination operation by using the registered fingerprints that were narrowed down. (S08, S09).

Figure 9:
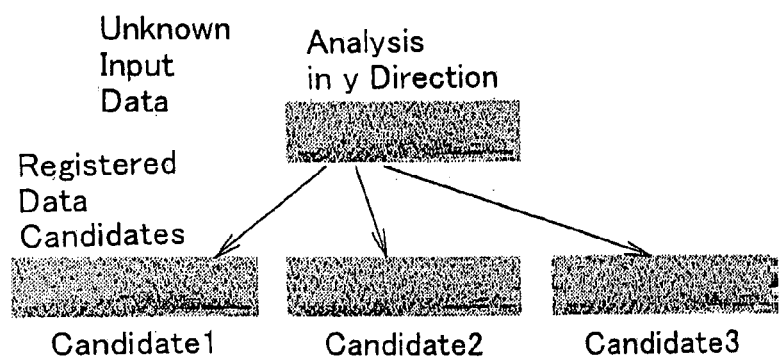
FIG. 9 is a diagram that explains verification of a GDS pattern in a y direction, which is performed in order to determine the identity of the fingerprint.

Specifically, the distances between the GDS patterns in the x direction have been calculated in step S07. Next, as shown in FIG. 9, a distance between the GDS pattern extracted from the fingerprint image collected from the person to be identified and each of the GDS patterns of the registered fingerprints narrowed down in step S07 will be calculated in the y direction (S08). A procedure for calculating each distance between the two corresponding GDS patterns in the y direction is the same as the above-described procedure for calculating each distance between the two corresponding GDS patterns in the x direction. That is, each distance between the two corresponding GDS patterns in the y direction can be calculated by Equation 3.

$$dist_y = \Sigma\Sigma|GDS_t(i, ch) - GDS_i(i, ch)| \quad \text{(Equation 3)}$$

When each distance between the two corresponding GDS patterns in the y direction is calculated, an amount of shift between the two corresponding fingerprint images is taken into consideration. Therefore, the middles of the two GDS patterns for comparison are shifted in the range of $-WD_0$ to $+WD_0$ and each distance is calculated. Each shortest distance is regarded as the distance ($dist_y$) between the two corresponding GDS patterns in the y direction.

After the distances ($dist_y$) between the GDS patterns in the y direction are calculated, the identity determination is performed based upon each distance ($dist_x$) between the two corresponding GDS patterns in the x direction, which was calculated in step S07, and based upon each distance ($dist_y$) between the same two corresponding GDS patterns, which was calculated in step S08 (S09). Specifically, in order to reflect, in the result of the identy determination, which direction contains more identification information, weighting $W_x$ is applied to each $dist_x$ calculated in the x direction and each $dist_y$ calculated in the y direction. The sum of the distances weighted as shown in Equation 4 is regarded as the total distance ($dist_{x,y}$) of the two corresponding GDS patterns.

$$dist_{x,y} = w_x \cdot dist_x + (1-w_x) \cdot dist_y \quad \text{(Equation 4)}$$

The distance expressed by Equation 4 is calculated for each of the registered fingerprints that were narrowed down. After the distances are calculated, the shortest distance among the calculated distances is determined as the final distance. If the finally determined distance exceeds a predetermined threshold, the person to be identified is judged not to be a registered person. On the other hand, if the finally determined distance is equal to or below the predetermined threshold, the person to be identified is judged to be a registered person. If the person to be identified is the registered person, the door is opened. If the person is not the registered person, a buzzer sounds and the person is prohibited from entering the room (S10). The above-described operation is the fingerprint verification operation that is performed by the fingerprint verification device.

As is clear from the above description, in the fingerprint verification device, the GDS patterns (fingerprints) that will be compared in the identity determination are narrowed down using part of the GDS pattern (i.e., GDS pattern in the x direction) that will be used for the identity determination. Therefore, it is not necessary to extract information other than the GDS pattern from the fingerprint image in order to determine the identity of the fingerprint image. Accordingly, the amount of calculation can be reduced. In addition, in order to determine the identity of the fingerprint image, the distances in the x direction ($dist_x$), which were calculated in the narrowing process, are utilized. Accordingly, the amount of calculation can be further reduced. For these reasons, the time required from the collection of the fingerprint to the output of the result of the determination can be shortened.

The above-described device narrows down the registered fingerprints by using the overall GDS pattern in the x direction. However, the present invention is not limited to such an example but can utilize a variety of different ways in order to perform the narrowing process. Other examples of the narrowing process will be discussed below with reference to the drawings. In the following embodiments, the features (i.e., the construction of the device, the identity determination process, etc.) except the narrowing process are the same as the above-illustrated embodiment. Therefore, only the narrowing process will now be explained.

FIRST MODIFIED EXAMPLE

Figure 10:
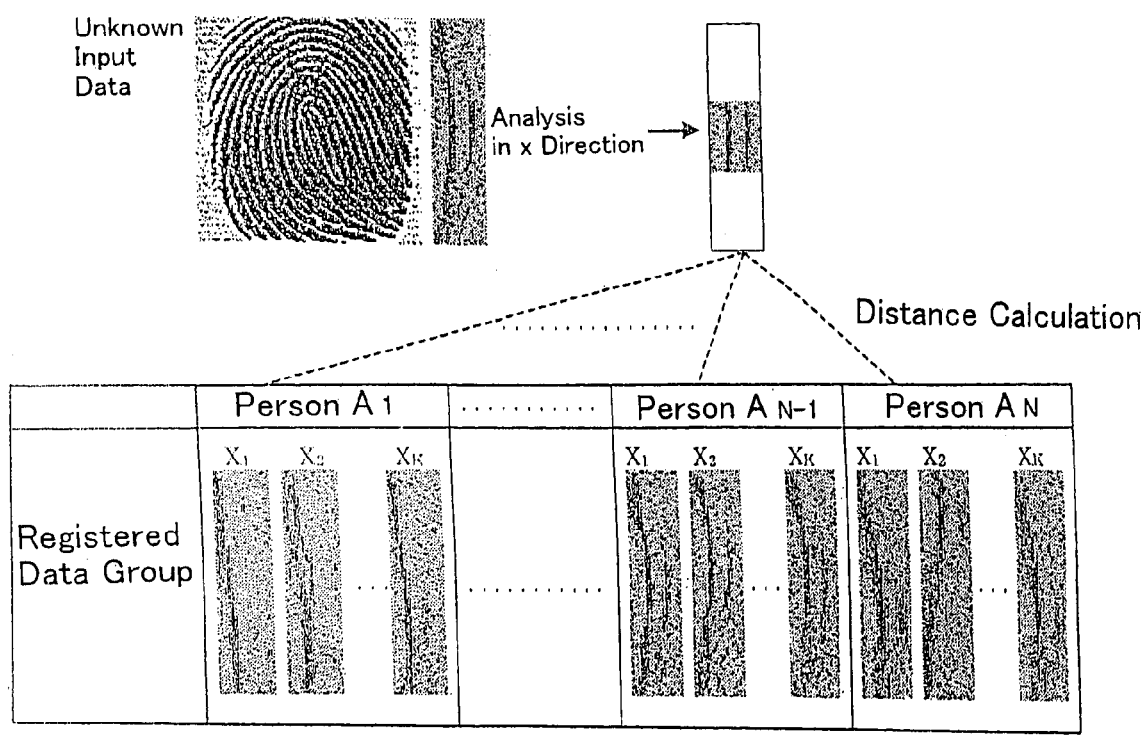
FIG. 10 is a diagram that explains another example of the narrowing process.

In the narrowing process according to the first modified example, as shown in FIG. 10, only the middle part of a GDS pattern in the x direction, which was extracted from a collected fingerprint image, is utilized, and a distance between the GDS pattern and each of GDS patterns in the x direction, which are stored in the characteristic information storage portion 26, is calculated. Specifically, the distance between the middle part of the GDS pattern extracted from the fingerprint image and the corresponding part (i.e., middle part) of each of the registered GDS patterns is calculated. In this case, each distance is calculated taking an amount of width of shift between the two corresponding fingerprint images into consideration. After the distance is calculated for all the registered GDS patterns in the x direction, a predetermined number (n-number) of registered fingerprints are selected in order of increasing distance, as the candidate fingerprints that will be used for identity determination.

Figure 11:
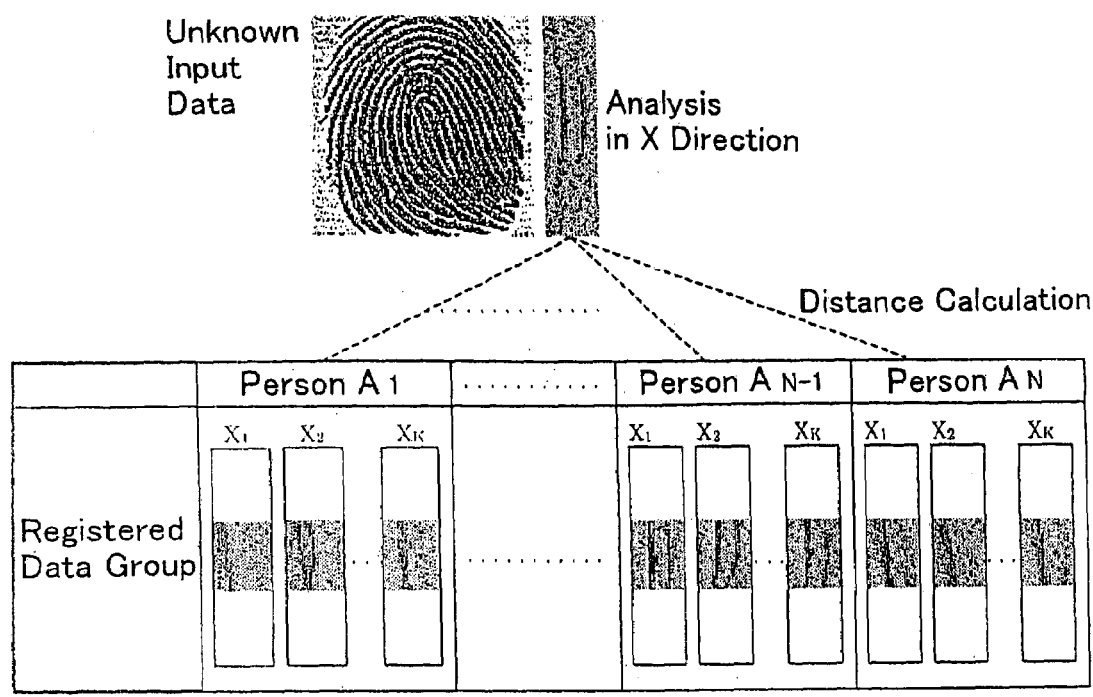
FIG. 11 is a diagram that explains a modified example of the narrowing process of FIG. 10.

Conversely, as shown in FIG. 11, the GDS pattern extracted from the collected fingerprint image and the middle parts of the GDS patterns stored in the characteristic information storage portion 26 can also be used for distance calculation. In the case of FIG. 11, the distance is calculated using the middle part of the GDS pattern of the fingerprint image and the middle part of each of the stored GDS patterns, therefore the result is substantially the same as the case of FIG. 10.

Figure 12:
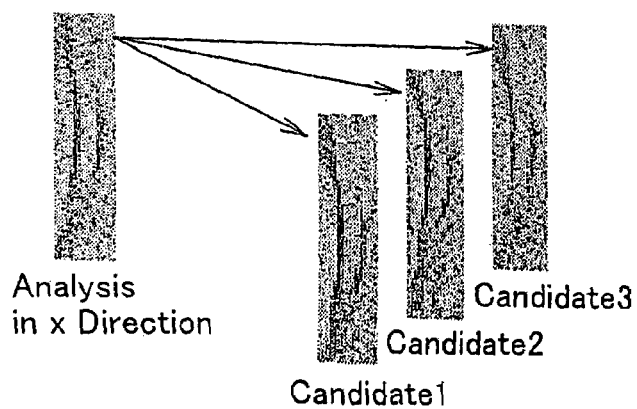
FIG. 12 is a diagram that explains verification of the GDS pattern in the x direction, which is re-performed after the narrowing process shown in FIGS. 10 and 11.

After the narrowing process is performed using the patterns as shown in FIG. 10 or 11, it is preferable that a distance in the x direction be recalculated using the two corresponding overall GDS patterns and the identity determination be carried out based upon the result of the recalculation and the result of calculation of a distance between the same corresponding overall GDS patterns in the y direction (see FIG. 12). Therefore, the identity determination accuracy can be enhanced.

In addition, in order to recalculate each distance between the two corresponding overall GDS patterns in the x direction, as shown in FIG. 12, it is preferable that the width of shift calculated in the narrowing process be stored and the stored width of shift be used for the recalculation of the distance as an assumed width of shift. Specifically, each width of shift wd that was obtained in order to calculate the distance between the two corresponding middle parts, which are shown in FIGS. 10 and 11, is stored. Then, when the distance between the two corresponding overall GDS patterns in the x direction is calculated, the respective width of shift wd is taken into consideration. Thus, the amount of calculation required in order to search the width of shift can be reduced.

It is preferable that the widths of shift be respectively stored for the narrowed registered fingerprints and the respective width of shift be used in order to calculate the distance between the overall GDS pattern extracted from the collected fingerprint and each of the corresponding overall GDS patterns of the narrowed registered fingerprints. Thus, the distances can be calculated using the widths of shift that correspond to the registered fingerprints.

SECOND MODIFIED EXAMPLE

In the above-described first modified example, the middle part of each of the two GDS patterns to be compared with each other is used as part of the respective GDS pattern, and the distance between the middle parts is calculated in order to narrow down the registered fingerprints. However, the present invention is not limited to it but can also utilize the following different ways.

Figure 13:
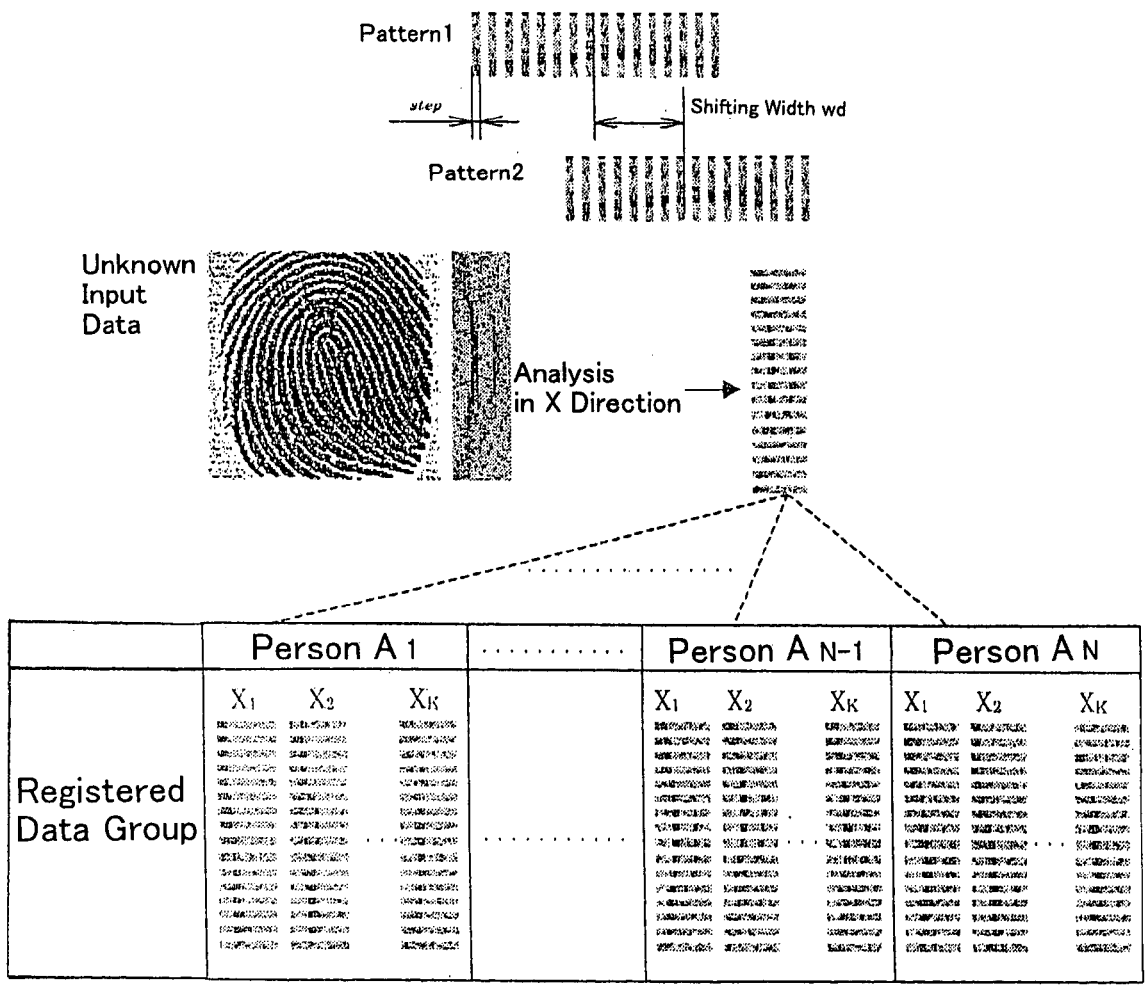
FIG. 13 is a diagram that shows another example of a verification area provided in a GDS pattern in one direction.

For example, in FIG. 13, a series of strips may be selected over the entire GDS pattern. If parts are selected in this way, narrowing is performed taking a tendency of the entire GDS pattern into consideration.

Figure 14:
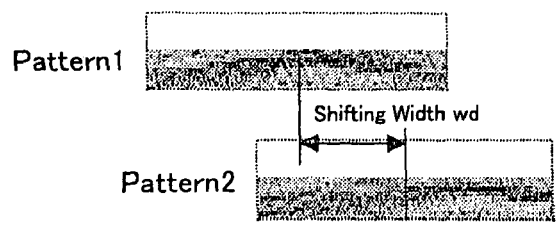
FIG. 14 is a diagram that shows further example of the verification area provided in the GDS pattern in the one direction.
Figure 15:
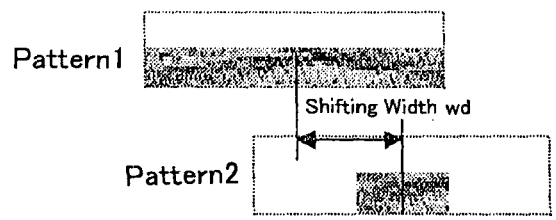
FIG. 15 is a modified example of the verification area shown in FIG. 14.

In addition, for example, as shown in FIG. 14, only low frequency components of the GDS pattern may also be selected in order to calculate distances that are used for narrowing down the registered fingerprints. By selecting only the low frequency components, the effect of noise components contained in high frequency components can be removed. Even in the case where the low frequency components are selected, only the middle parts, as shown in FIG. 15, may be selected for distance calculation. In this case, although the target area for the distance calculation is narrow, high frequency components have been removed from the GDS pattern of the target area that is used for the distance calculation. Accordingly, the registered fingerprints can accurately be narrowed down.

Figure 16:
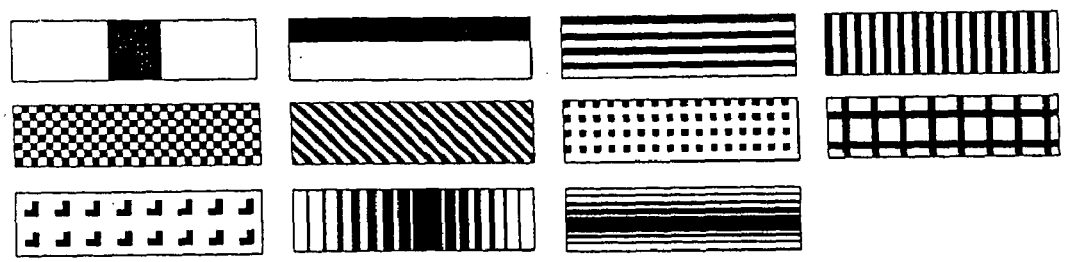
FIG. 16 shows further examples of the verification area provided in the GDS pattern in the one direction.

In addition, as shown in FIG. 16, an area that is established within the GDS pattern in order to perform the narrowing process may be suitably determined by a designer according to, for example, a degree to which accuracy in narrowing down the registered fingerprints is required. In addition, the GDS patterns of the registered fingerprint images may be grouped together as a statistical population in order to obtain dispersion or standard deviation in each frequency area, and the frequency area where the dispersion or standard deviation is great may be established. In this case, because differences between calculated distances becomes larger, the narrowing process can be performed efficiently.

THIRD MODIFIED EXAMPLE

Figure 17:
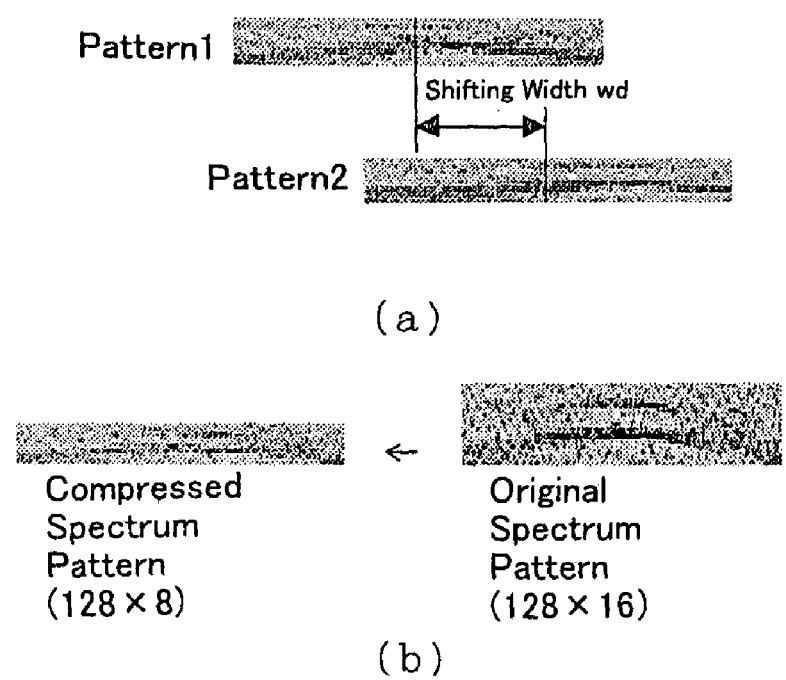
FIG. 17 is a diagram that explains further examples of the narrowing process.

In the above-described first and second modified examples, the part of the GDS extracted from the fingerprint image is established as the area that is used for the distance calculation in order to narrow down the registered fingerprints. However, the present invention is not limited to such examples. Instead, as shown in FIG. 17(b), the GDS pattern extracted by the characteristic information extraction portion 14 may be compressed and used in order to perform the narrowing process (refer to FIG. 17(a)). By compressing the GDS pattern, data that are used for the distance calculations can be reduced. Consequently, the calculating time required for the narrowing process can be shortened. After the narrowing process is performed using the compressed spectrum pattern, identity determination is preferably carried out using its uncompressed spectrum pattern. Thus, the verification accuracy is prevented from decreasing.

FOURTH MODIFIED EXAMPLE

In the above-described narrowing process, the fingerprints that will be used for the identity determination are narrowed down on a fingerprint image basis. However, the present invention is not limited to it but the narrowing process may be performed on a registered person basis. Such a method will now be explained with reference to FIGS. 18 and 19.

Figure 18:
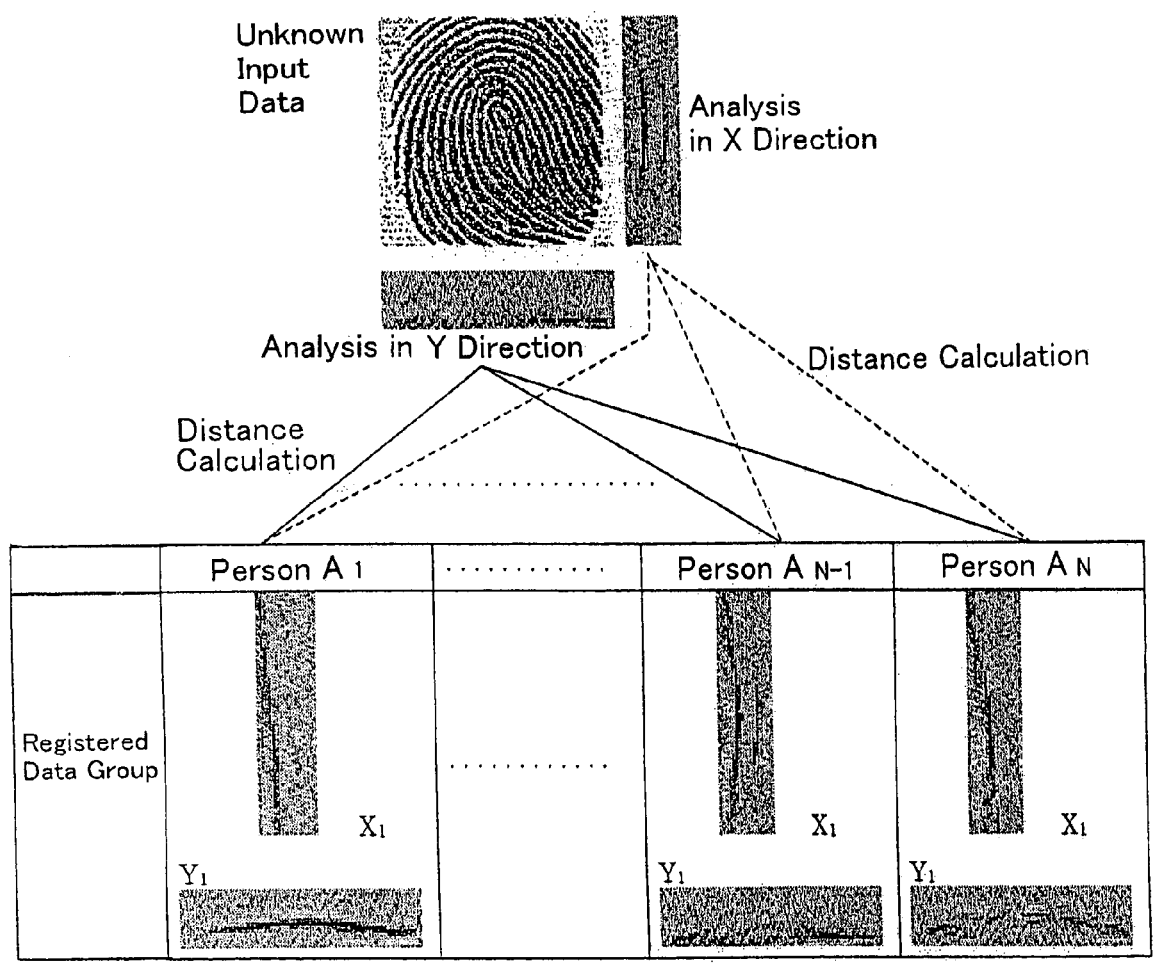
FIG. 18 is a diagram that explains an example of a narrowing process in which registered persons that will be used for identity determination are narrowed down in the case where a plurality of fingerprint images has been registered for each registered person.

In this method, as shown in FIG. 18, a GDS pattern in the x direction and a GDS pattern in the y direction, both of which were extracted from a person to be identified, are used. Likewise, among the GDS patterns in the x direction and the Y direction, which are stored in the characteristic information storage portion 26, one pair of GDS patterns is used for each registered person. Then, a distance between the two corresponding GDS patterns in the x direction and a distance between the two corresponding GDS patterns in the y direction are calculated and the sum of the distances is calculated for each registered person (refer to Equation 4). After the distances are calculated, a predetermined number (n-number) of registered persons are selected in order of increasing distance (i.e., in order of decreasing similarity).

Figure 19:
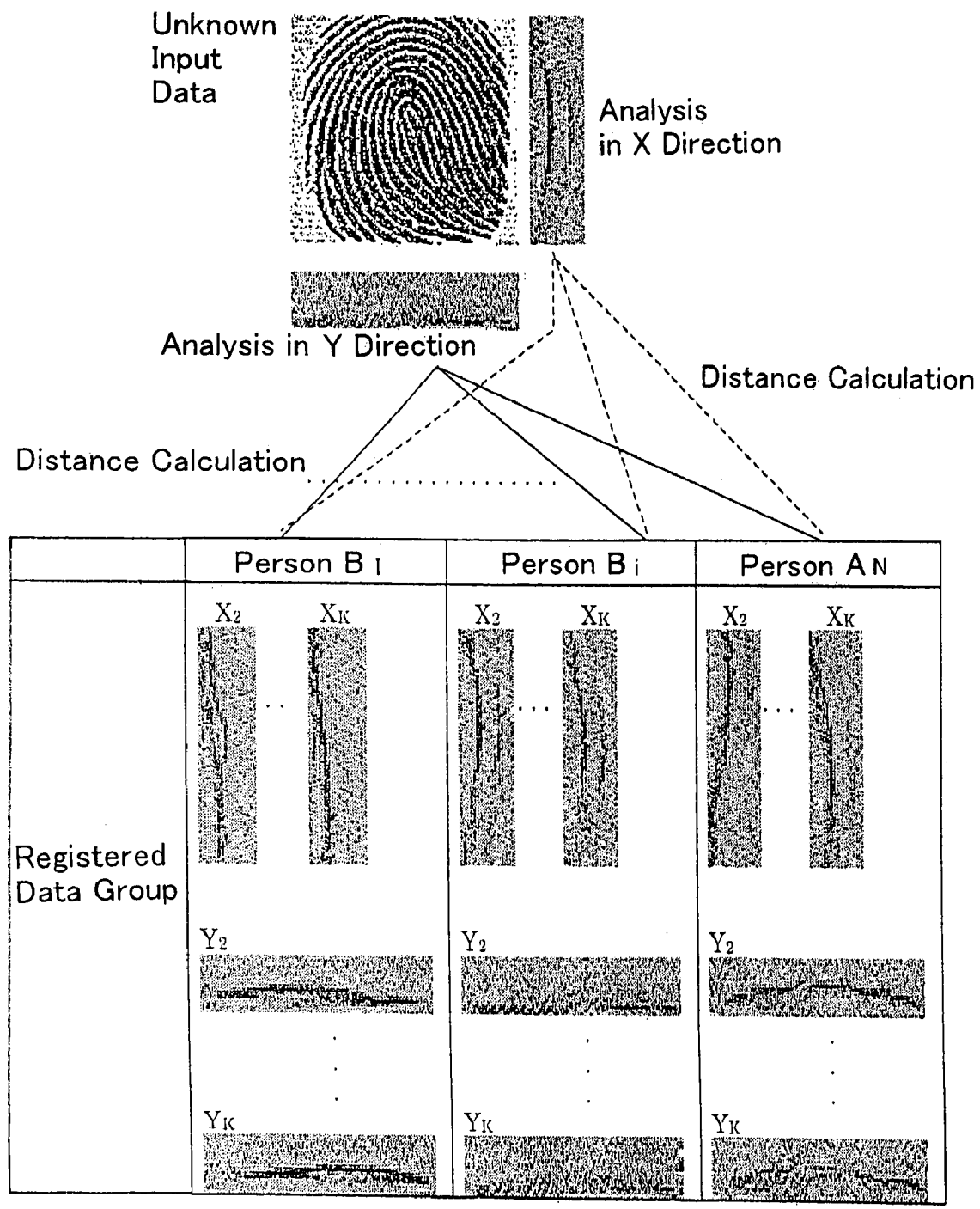
FIG. 19 is a schematic diagram that explains the identity determination that is performed with respect to the registered persons narrowed down by the process of FIG. 18.

After the n-number of registered persons are selected, distances between the GDS patterns (x direction, y direction) of the collected fingerprint image and remaining pairs [(a−1) pairs, wherein the letter a represents the number of pairs] of corresponding GDS patterns (x direction, Y direction) of each selected registered person are calculated (see FIG. 19). Next, whether or not the smallest value among the calculated distances is equal to or below a threshold is determined in order to judge whether or not the person to be identified is a registered person.

In such a method, because the narrowing process is performed using the GDS pattern in the x direction and the GDS pattern in the y direction, both of which were extracted from the collected fingerprint image, the narrowing process accuracy improves. In addition, even if the GDS patterns in the x and y directions, which were extracted from the collected fingerprint image, are used, only one pair of GDS patterns of each registered person is used for the narrowing process. Therefore, the amount of calculation can be minimized.

Preferably, the one pair of GDS patterns, which is selected from the plurality of pairs of GDS patterns of each registered person, is a pair of GDS patterns of high quality that provides much identification information (i.e., fingerprint ridgeline information). By selecting the high quality images containing much identification information, the registered fingerprints can be highly accurately narrowed down.

Further, in the above-described example, only one pair of GDS patterns is selected for each registered person. However, a plurality of pairs (e.g., two pairs) of GDS patterns may be selected for each registered person, in the case of which the sum of the pairs of distances is calculated and the number of registered persons are narrowed down based upon the sum in order to perform the identity determination. According to such a method, the narrowing process accuracy further improves.

Even in the case where the narrowing process is carried out on the registered person basis, the registered persons may be narrowed down by using only a GDS pattern in the x direction or only a GDS pattern in the y direction, just as in the case of the above-described embodiment. Specifically, the narrowing process may be carried out by using the GDS pattern in the x direction (or the y direction), which was extracted from the fingerprint image collected from a person to be identified, and only one GDS pattern in the x direction (or the y direction), which was selected for each registered person. According to such an example, the amount of calculation can be further reduced.

Further, in the examples illustrated in FIGS. 10, 11, 13, 14, and 15, each GDS pattern may be partly used in order to narrow down the registered persons. According to such examples, the amount of calculation can be lessened.

The preferred embodiments of the present invention have been explained in detail above. However, these are only examples. The present invention can be embodied in a variety of improved configurations that include a multitude of changes and improvements based upon the knowledge and skill in the art.

In the above-described embodiments, the fingerprints are narrowed down and used for the identity determination, by using the GDS pattern extracted from the collected fingerprint image. However, in the present invention, the narrowing process and the identity determination process can also be performed based upon any other spectrum (e.g., FFT spectrum, DFT spectrum, or LPC spectrum), which is obtained by a variety of frequency conversion processes, in addition to the GDS spectrum. In addition, based upon a cepstrum, the registered fingerprints may be narrowed and used for the identity determination. The cepstrum is obtained by performing Fourier conversion of a logarithmic spectrum, which was obtained by frequency conversion and assuming it to be a waveform signal.

Also, a minutia (i.e., characteristic point) may be used in order to perform the narrowing process and the identity determination process. Specifically, priorities are assigned to a plurality of minutiae, a predetermined number of high-priority minutiae are compared with corresponding minutiae, and then the registered fingerprints are narrowed down based upon the result of the comparison. When the identity determination is performed, the number of minutiae that will be used for comparison may be increased so as to obtain a predetermined degree of comparison accuracy.

Further, as a method for evaluating the similarities in order to narrow down the registered fingerprints and in order to compare the collected fingerprint with the registered fingerprints, various methods can be utilized instead of the above-described method in which a distance between two corresponding GDS patterns is calculated. For instance, the sum of the square of a difference between the two corresponding GDS patterns may be utilized as an evaluated value. In the alternative, a geometric mean of the difference between the two corresponding GDS patterns can also be utilized as an evaluated value.

Furthermore, in terms of the fingerprint collection method, a fingerprint image can be collected by any method. For example, the fingerprint may be collected using a non-optical system that utilizes a fingerprint reading chip. Even if the fingerprint is collected by the optical system in the same manner as in the above-described embodiment, an optical path separation type or a total reflection type can also be utilized.

The invention claimed is:

1. A fingerprint verification device that compares a fingerprint of a person to be identified with a plurality of registered fingerprints, the fingerprint verification device comprising:
   means for storing characteristic information extracted from fingerprint images of registered persons;
   means for collecting a fingerprint image;
   means for extracting characteristic information from the fingerprint image collected by the fingerprint image collection means;
   means for narrowing down the registered fingerprints that will be used for identity determination, wherein the narrowing means calculates a similarity between part of the characteristic information of the person to be identified, which was extracted by the characteristic information extraction means, and corresponding part of the characteristic information of each registered person, which is stored in the characteristic information storage means, and then the narrowing means narrows down the registered fingerprints based upon the calculated similarity; and
   means for determining whether or not the characteristic information of each of the registered fingerprints, which were narrowed down by the narrowing means, matches the characteristic information of the person to be identified, which was extracted by the characteristic information extraction means, wherein the determination means calculates a similarity between other part of the characteristic information extracted from the fingerprint image of the person to be identified and corresponding part of the characteristic information of each of the registered fingerprints narrowed down, and then the determination means performs the identity determination based upon the sum of the calculated similarities.

2. A device as in claim 1, wherein the characteristic information is a spectrum characteristic of a spectrum obtained by frequency converting a density variation along each of scanning lines, in which the density variation is assumed to be a time series signal, the scanning lines extending in two directions orthogonal to each other.

3. A device as in claim 2, wherein the narrowing means calculates a similarity between the spectrum characteristic in one of the two directions, which was extracted from the fingerprint image of the person to be identified, and the corresponding spectrum characteristic in the one direction, which was extracted from each registered person, and then the narrowing means narrows down the registered fingerprints based upon the similarity.

4. A device as in claim 3, wherein by using a spectrum characteristic in the other direction that has not been used for the similarity calculation by the narrowing means, the determination means calculates a similarity between the spectrum characteristic extracted from the fingerprint image of the person to be identified and a corresponding spectrum characteristic of each of the registered fingerprints narrowed down, and then the determination means performs the identity determination based upon the sum of the calculated similarity and the similarity that has been calculated by the narrowing means.

5. A device as in claim 4, wherein the narrowing means narrows down the registered fingerprints by calculating the similarity using the part of the characteristic information extracted from the fingerprint image, the part containing sufficient identification information for identifying the fingerprint image.

6. A device as in claim 3, wherein the narrowing means narrows down the registered fingerprints by calculating the similarity using the part of the characteristic information extracted from the fingerprint image, the part containing sufficient identification information for identifying the fingerprint image.

7. A device as in claim 2, wherein the narrowing means narrows down the registered fingerprints by calculating the similarity using the part of the characteristic information extracted from the fingerprint image, the part containing sufficient identification information for identifying the fingerprint image.

8. A device as in claim 1, wherein the narrowing means narrows down the registered fingerprints by calculating the similarity using the part of the characteristic information extracted from the fingerprint image, the part containing sufficient identification information for identifying the fingerprint image.

9. A fingerprint verification device that compares a fingerprint of a person to be identified with a plurality of registered fingerprints, the fingerprint verification device comprising:
   means for storing characteristic information extracted from fingerprint images of registered persons;
   means for collecting a fingerprint image;
   means for extracting characteristic information from the fingerprint image collected by the fingerprint image collection means;
   means for narrowing down the registered fingerprints that will be used for identity determination, wherein the narrowing means calculates a similarity between part of the characteristic information of the person to be identified, which was extracted by the characteristic information extraction means, and corresponding part of the characteristic information of each registered person, which is stored in the characteristic information storage means, and then the narrowing means narrows down the registered fingerprints based upon the calculated similarity; and
   means for determining whether or not the characteristic information of each of the registered fingerprints, which were narrowed down by the narrowing means, matches the characteristic information of the person to be identified, which was extracted by the characteristic information extraction means,
   wherein, when calculating the similarity between the part of characteristic information extracted from the fingerprint image of the person to be identified and the corresponding part of the characteristic information of each of the stored registered fingerprints, the narrowing means calculates and stores a width of shift between the two characteristic information.

10. A device as in claim 9, wherein, within a predetermined range around the width of shift stored by the narrowing means, the determination means calculates a similarity between the characteristic information extracted from the fingerprint image of the person to be identified and the corresponding characteristic information of each of the fingerprints narrowed down, and then the determination means performs the identity determination based upon the calculated similarity.

11. A fingerprint verification device for comparing a fingerprint of a person to be identified with a plurality of registered fingerprints, the fingerprint verification device comprising:

- a storage portion that stores characteristic information extracted from fingerprint images of registered persons;
- a collection portion that collects a fingerprint image; and
- a verification portion that extracts characteristic information from the fingerprint image collected by the collection portion, wherein the verification portion calculates a similarity between part of the characteristic information from the fingerprint image collected by the collection portion and corresponding part of the characteristic information of each of the registered fingerprints, then narrows down the registered fingerprints based upon the calculated similarity, wherein the verification portion further calculates a similarity between other part of the characteristic information extracted from the fingerprint image collected by the collection portion and corresponding part of the characteristic information of each of the registered fingerprints narrowed down, and determines, based upon the sum of the calculated similarities, whether or not the characteristic information of each of the registered fingerprints narrowed down matches the characteristic information extracted from the fingerprint image of the person to be identified.

12. A fingerprint verification method in which pieces of characteristic information, which were extracted from fingerprint images of registered persons, are stored in a storage portion, a piece of characteristic information, which was extracted from a fingerprint image of person to be identified, is compared with each piece of characteristic information stored in the storage portion, thereby determining whether or not the fingerprint image of the person to be identified matches the fingerprint image of the registered person, the method comprising the steps of:

- calculating a similarity between part of the piece of characteristic information extracted from the fingerprint image of the person to be identified and corresponding part of each piece of characteristic information stored in the storage portion;
- narrowing down the pieces of characteristic information stored in the storage portion based upon the calculated similarity;
- calculating a similarity between other part of the characteristic information extracted from the fingerprint image of the person to be identified and corresponding part of each piece of the characteristic information narrowed down; and
- determining, based upon the sum of the calculated similarities, whether or not each piece of the characteristic information narrowed down matches the characteristic information extracted from the fingerprint image of the person to be identified.

* * * * *